G. H. CHASE.
PANORAMIC CAMERA.
APPLICATION FILED NOV. 12, 1917.

1,294,046.

Patented Feb. 11, 1919.

UNITED STATES PATENT OFFICE.

GEORGE H. CHASE, OF EMPORIA, KANSAS.

PANORAMIC CAMERA.

1,294,046.   Specification of Letters Patent.   Patented Feb. 11, 1919.

Application filed November 12, 1917. Serial No. 201,606.

*To all whom it may concern:*

Be it known that I, GEORGE H. CHASE, a citizen of the United States, and resident of Emporia, in the county of Lynn and State of Kansas, have invented new and useful Improvements in Panoramic Cameras, of which the following is a specification.

This invention relates to panoramic cameras.

An important object is to provide in a device of the above mentioned character a means whereby several exposures may be made and blended one with the other upon a film to produce as a result thereof a single picture.

A further object is to provide in a device of the above mentioned character a means whereby a plurality of exposures may be made upon a stationary film to produce as a result thereof a plurality of individual pictures.

A further object is to provide in a device of the above mentioned character a means whereby light rays designed to be projected upon a given area of a stationary film may be confined entirely to the desired given area.

A further object is to provide in a device of the above mentioned character a means whereby the horizontal lines of a picture will be bent or broken in such a manner as to render the bend or break less susceptible to the sense of sight than has heretofore been possible with the more conventional types of panoramic cameras.

A further object is to provide in a device of the above mentioned character a means whereby the exact focal point may be easily determined prior to the making of the exposure and effectively retained during the exposure.

A further object is to provide a device of the above mentioned character which may be used not only in making single exposures from which individual pictures may be developed but also in making a plurality of exposures from which one continuous picture may be developed.

A further object is to provide a device of the above mentioned character which is simple in construction, inexpensive to manufacture, strong, durable, compact in arrangement of parts, and effective in operation.

Other objects and advantages of the invention will be apparent during the course of the following description.

In the accompanying drawings, forming a part of this specification and in which like numerals are employed to designate like parts throughout the same, Fig. 10 is an end elevation of the camera, and, Fig. 11 is a vertical transverse sectional view of the same.

In the drawings wherein for the purpose of illustration is shown a preferred form of my invention, the numeral 15 indicates a base having secured thereto a pair of vertical supports 16 and 17 upon which is disposed a top 18. This base together with the top and the supports constitute the main body of the camera receptacle to which is pivotally connected a pair of wings 19 and 20. Each of these wings is provided at the free end thereof with spool receptacles 21 and 22, respectively. These wings 19 and 20 are connected with the main body of the camera by means of bellows 23 and 24, respectively. To each wing at the lower side thereof there are connected guides 25 and 26, respectively. These guides are arcuate in shape and provided with slots 27 and 28 adapted to receive therein thumb-screws 29 and 30, respectively. These arcuate-shape guides together with the thumb-screws serve to maintain the wings in either an open or closed position with respect to the main body.

Figure 1:
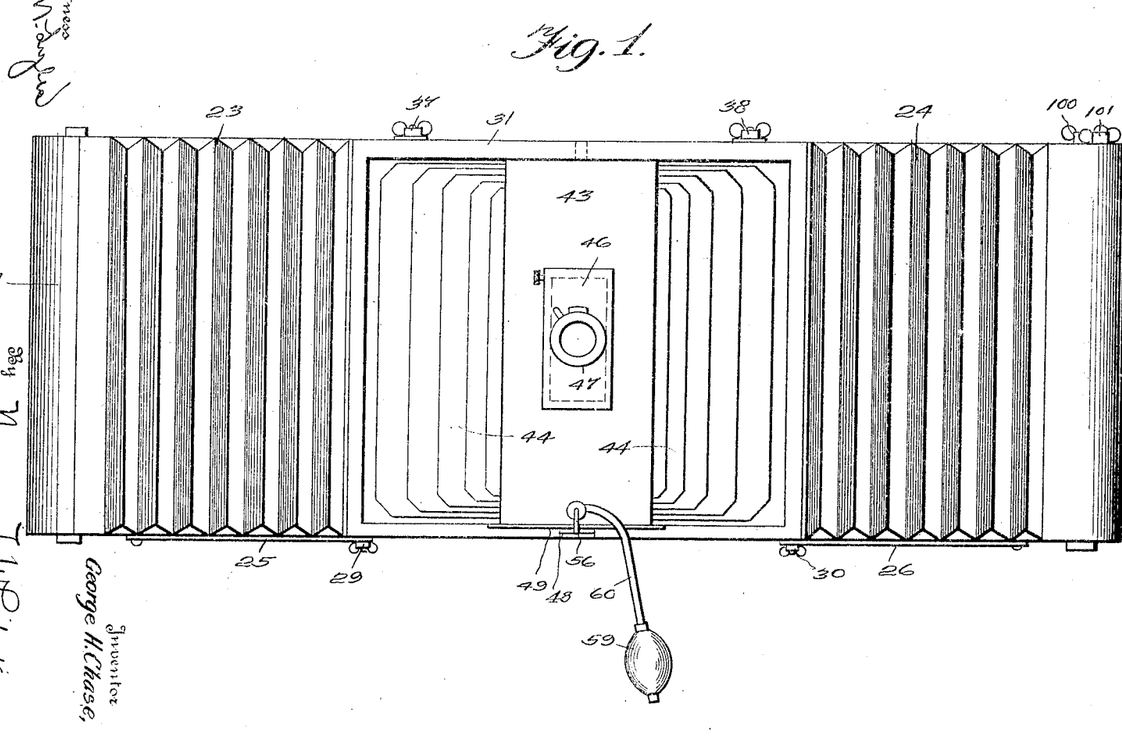
Figure 1 is a front elevation of a device embodying the invention.
Figure 2:
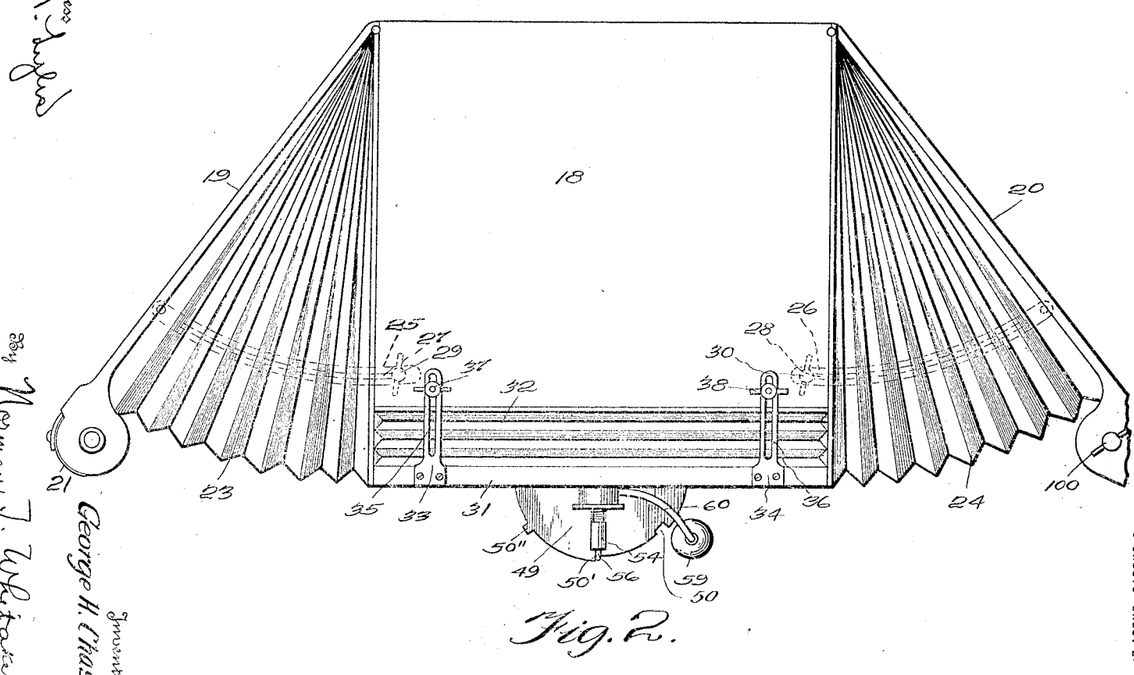
Fig. 2 is a plan view of the same.

To the front of the main body there is connected a frame 31 by means of guides 33 and 34 each of which is provided with an elongated slot 35 and 36, respectively, which slots are adapted to receive therein thumb-screws 37 and 38, respectively. Within the frame 31 there is vertically pivoted a front board 43. To each side of this front board there is secured a bellows 44. This bellows is in turn connected to the sides of the frame 31, as clearly shown in Fig. 1. To the front of the main body there is connected a bellows 32 which in turn is connected to each of the bellows 23 and 24. The bellows 32 is connected to the top and bottom of the bellows 44. There is disposed centrally within the front board 43 a rising front 46 of the conventional type, which rising front carries an elongated cylinder 47 having disposed centrally therein a lens of the ordinary type, not shown, the center of which lies within the true vertical axis of the front board 43.

To the lower member of the frame 31 there is connected a bracket 48, supporting a semi-circular table 49 provided with a notch 50 and a plurality of stops indicated by the numerals 50' and 50''. It will be noted that the arc lying between the stops 50' and 50'' is substantially equal to the arc lying between the stop 50' and the notch 50 and that these arcs have a common center but that the radii of these arcs are unequal in length. The purpose of this unequality of radii will be fully understood when considering the hereinafter described operation of the device. There is connected to the pivot 51, of the front board 43, a spiral spring 52 adapted to intermittently rotate the front board 43 in a clockwise direction as will hereinafter be described. To the front board 43 there is connected a cylinder 53 carrying thereupon a sleeve 54 the end of which is closed as shown at 55 and provided with an angularly shaped arm 56. A suitable coil spring connects the cylinder 53 and sleeve 54 which tends to maintain a telescoped relation between the cylinder and sleeve. The cylinder 53 is provided with a nipple 58, the center opening of which communicates with ordinary compressible hand bulb 59 by means of a flexible tube 60.

The inner side of the front board 43 is provided with a segmental gear 61, the teeth of which are adapted to engage with the teeth of pinions 62 and 63. These pinions are pivoted to a stationary platform 64, carried within the main body of the camera, and are provided with rotatable pins 65 and 66, respectively. These pins are provided with slots 67 and 68, respectively, which slots are adapted to receive therein slidable partitions 69 and 70, respectively. The lower edges of these partitions are adapted to slidably move within grooves 71 and 72, respectively, carried by guides 73 and 74 pivoted to the base 15 of the main body as shown at 75 and 76. The grooves 71 and 72 each carry stationary partitions 77 and 78, the ends of which are adapted to overlap the ends of the slidable partitions 69 and 70, as clearly shown in Fig. 3. The free end of each guide has disposed therein a revoluble ball 74' which is adapted to support the ends of the guide and facilitate easy movement of the same upon the base 15.

The base 15 and the top 18 of the main body are each provided at the rear edge thereof with grooves 79 and 80 extending longitudinally throughout the length of the same. These grooves are identical with grooves carried by the top and bottom frame members 81, 82 and 83, 84 of the wings 20 and 19, respectively, the last mentioned grooves being indicated by the dotted lines of Fig. 5.

Figures 5, 6, 7, 8, 9:
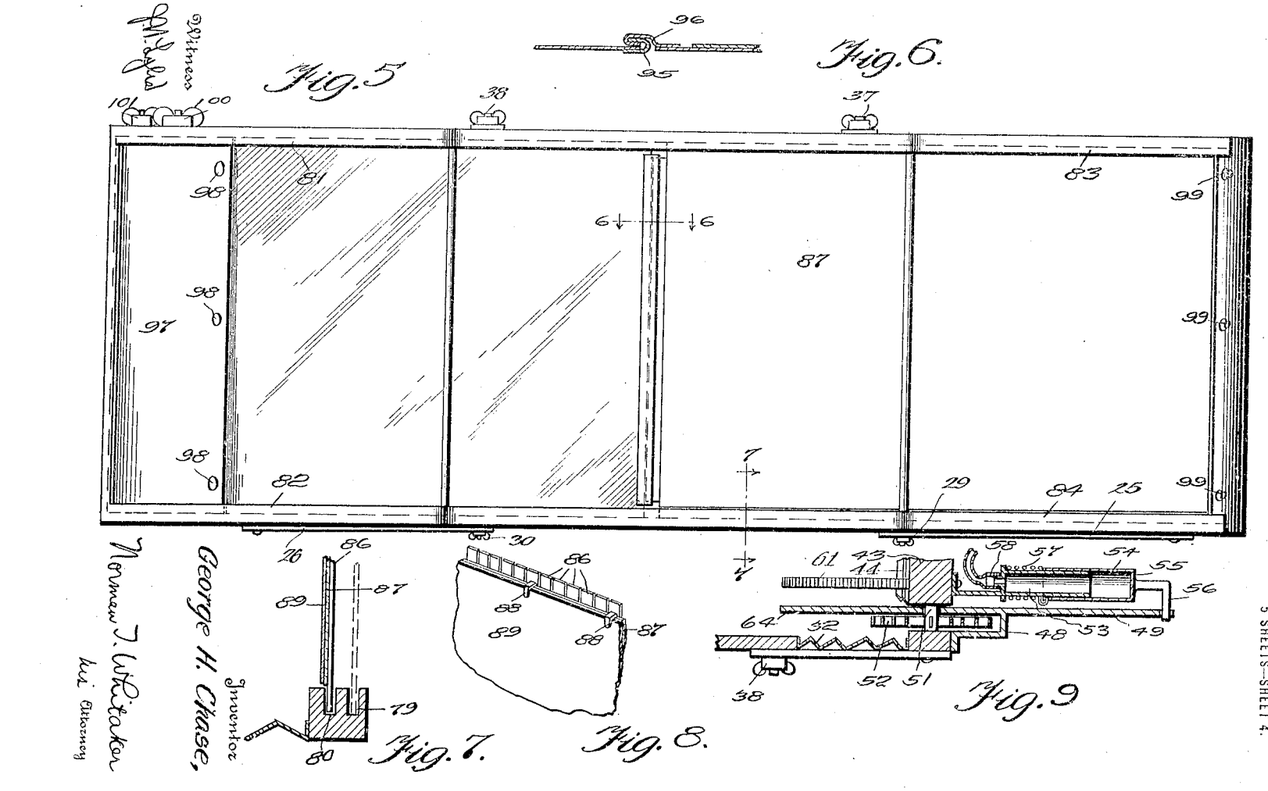
Fig. 5 is a rear elevation of Fig. 1.
Fig. 6 is a section view of Fig. 5 taken on line 6—6.
Fig. 7 is a sectional view of the same taken on line 7—7.
Fig. 8 is a fragmental perspective view of an opaque curtain showing a sensitized film attached thereto.
Fig. 9 is a central vertical longitudinal sectional view of a front board actuating mechanism.
Figure 10:
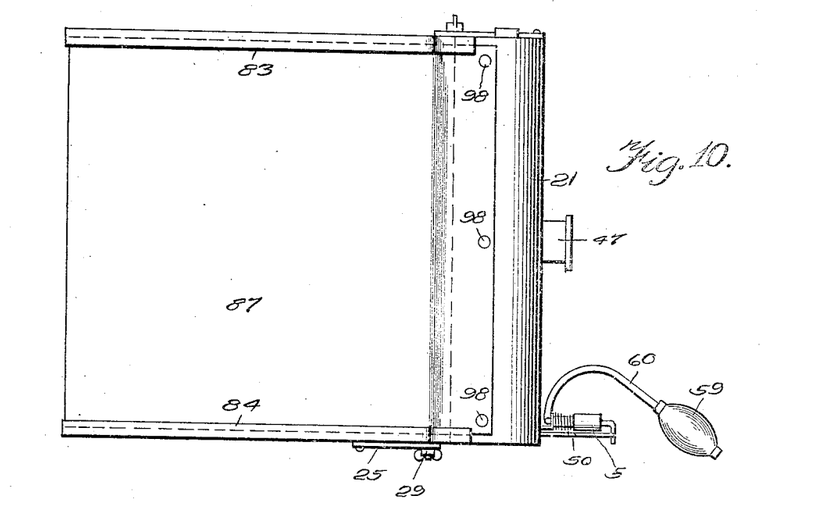
Figure 11:
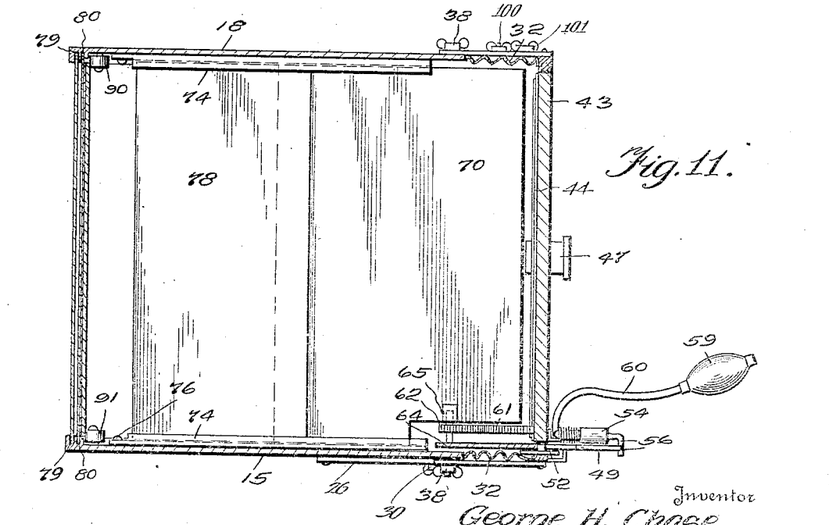

Within the spool receptacle 21 of the wing 19 there is disposed a spool 85, having wound thereupon a film carrying curtain comprising a plurality of slats 86 to which is secured a suitable cloth or fabric 87 upon which there is detachably secured, by means of clamps 88, a sensitized film 89. The ends of the slats are adapted to fit within the grooves 80 as shown in Figs. 7 and 11. In order to prevent the film carrying curtain from binding in its travel at the juncture of the wings, 19 and 20, with the main body there is provided suitable rollers 90 and 91, the rollers 90 being journaled to the top 18 as shown, while the rollers 91 are journaled to the base 15. Within the spool receptacle 22 carried by the wing 20 there is disposed a pair of spools 92 and 93. The spool 92 carries a suitable focusing film 94, such as celluloid or the like, the end of which is provided with a U-shaped clasp 95 adapted to detachably engage a similar clasp 96 carried by the film carrying curtain. The spool 93 carries an opaque curtain 97 adapted to fit into and travel within the grooves 79 as shown in Fig. 11. The end of this curtain is provided with a plurality of thumb-clasps 98 adapted to engage co-acting members 99 disposed upon the outer face of the spool receptacle 21. Upon the spool receptacle 22 there is disposed a pair of buttons 100 and 101, which buttons are adapted to actuate the spools 92 and 93, respectively.

Figures 3, 4:
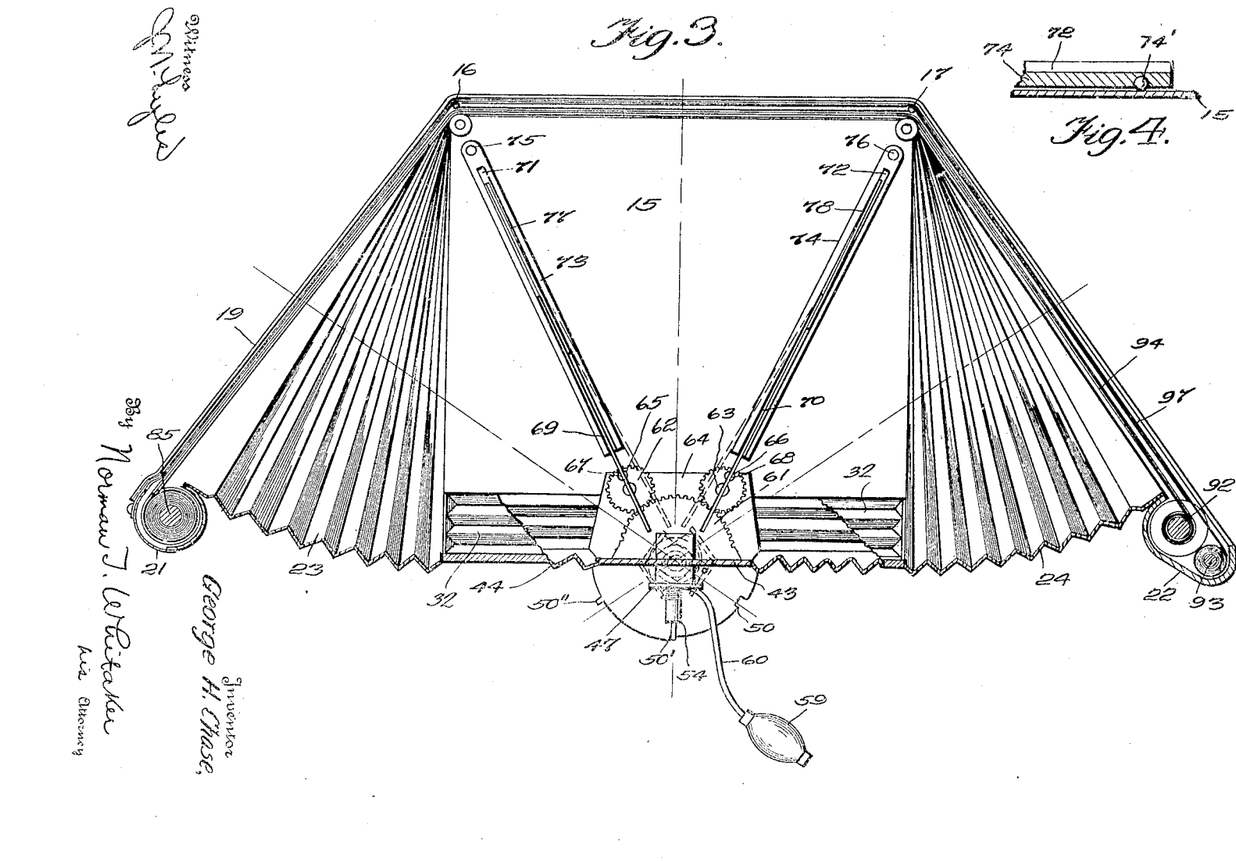
Fig. 3 is a horizontal sectional view of Fig. 1.
Fig. 4 is a fragmental sectional view of a guide.

In use, the operation of the device is as follows: When it is desired to take a plurality of pictures, the sensitized film which is to be exposed is secured to the film carrying curtain, which film together with the film carrying curtain is confined within the spool receptacle 21. The focusing film 94, carried by the spool 92, is moved throughout the length of the grooves 80 and is secured to the end of the film carrying curtain, as shown in Fig. 6. The cylinder 47 is moved to the dotted line position shown in Fig. 3, bringing the axis thereof at right-angles to the wing 19, whereupon the arm 56 enters the notch 50. The frame 31 is then adjusted inwardly or outwardly with respect to the main body in order to obtain the correct focusing of the object of which the picture is desired to be made. The object to be photographed is then focused upon that portion of the focusing film carried by the wing 19. The bulb 59 is then compressed, whereupon the arm 56 is released from the notch 50, allowing the cylinder 47, under the influence of the spiral spring 52, to move to the position clearly shown in Fig. 3, it being stopped at this position due to the contact of the arm 56 with the stop 50'. The object is then focused upon that portion of the focusing film carried by the main body of the camera. After having focused the object upon this portion, the cylinder 47 is moved as hereinbefore described to such a position as will bring the axis thereof at right-angles to the wing 20, whereupon the object is focused upon that portion of the focusing film 94 carried by the wing 20. In order to adjust the normally stationary partitions 77 and 78 to produce a picture showing no line of demarcation at the jointure of the several exposures, the cylinder 47 is moved to a position such as will bring the axis thereof substantially in alinement with the partition 77. This partition is then moved either forward or backward in order to determine the point at which it should be allowed to remain to produce a perfect reproduction. This point is determined by the adjustment when the dark line appearing upon the focusing film immediately back of the partition totally disappears. In order to determine the position at which the normally stationary partition 78 should be allowed to remain an adjustment is made of the same as hereinbefore described in connection with the partition 77. After having determined the position at which the frame 31 carrying the cylinder 47 should be allowed to remain together with the position the normally stationary partitions 77 and 78 should be allowed to remain, the opaque curtain 97 is moved throughout the entire length of the groove 79, whereupon the end of the same is buckled or clasped to the outer face of the spool receptacle 21 as shown in Fig. 3. The focusing film 94 is then wound upon the spool 92 by means of the button 101, thereby drawing the film carrying curtain together with the sensitized film throughout the entire length of the grooves 80. The cylinder 47 is then moved to such a position as will bring the axis thereto into perpendicular relation with the wing 19 as shown in Fig. 3. The exposure is then made in the usual manner. It is to be noted that, when the cylinder 47 is in such a position as will enable an exposure to be made upon that portion of the sensitized film carried by the wing 19, the end of the slidable partition 69 is moved into the dotted line position, shown in Fig. 3, this position being such as will prevent light rays from contacting with that portion of the sensitized film carried by the main body which portion is as yet to be exposed. After having made the exposure upon that portion of the sensitized film carried by the wing 19, the bulb 59 is compressed, releasing the arm 56 from the notch 50, and allowing the cylinder 47 to move to the position clearly shown in Fig. 3, as hereinbefore described. The exposure is then made upon that portion of the sensitized film carried by the main body. It is to be noted, while the cylinder 47 remains in this position, that the ends of the slidable partitions 69 and 70 remains in such a position with respect to the cylinder 47 as to exclude the light rays from that portion of the film which has been exposed and that portion of the film carried by the wing 20 which is as yet to be exposed. After the exposure has been made upon this second portion of the film, as described, the bulb 59 is compressed, whereupon the cylinder 47 moves to such a position as to bring the axis thereof into perpendicular relation with that portion of the sensitized film carried by the wing 20. The exposure is then made upon this portion of the film. It is to be noted, when the cylinder 47 is in such a position as to permit an exposure to be made upon this last named portion of the sensitized film, that the end of the slidable partition 70 is so positioned, with respect to the cylinder 47, as to prevent light rays from passing into contact with either of the portions of the film previously exposed. After having exposed the entire film, as hereinbefore described, the same is wound upon the spool 92, whereupon it may be removed from the receptacle 22 and developed in the usual manner.

It may be well for me to state here that should it be desired to use this camera to take a plurality of individual pictures from which it is not intended to produce a panoramic view this may be done by maintaining the wings 19 and 20 in a closed position by means of the guides 25 and 26 clamped by the thumb-screws 29 and 28, respectively. The first exposure may be made upon the film whereupon the film is moved into such a position as will allow a separate and distinct exposure to be made upon a succeeding portion of the film. This operation may be continued throughout the entire length of the film, the number of pictures capable of being produced depending entirely upon the length of the sensitized film used in this connection.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim as new and desire to secure and protect by Letters Patent of the United States, is:

1. A device of the character described comprising a receptacle adapted to receive therein a sensitized film; a lens associated with said receptacle, said lens being adapted to direct light rays upon given area of said film; means for rotating said lens about an axis passed through the optical center of the lens at right angles to the axis thereof, operable means for confining the light rays to a given area of said film, the operation of the last named means being dependent upon the rotation of said lens.

2. A device of the character described comprising a receptacle adapted to receive therein a sensitized film; a lens associated with said receptacle, means for rotating said lens about an axis passed through the optical center of the lens at right angles to its axis whereby light rays may be directed upon given areas of said film in succession; and operable means for confining the light rays to a given area of said film, the operation of the last named means being dependent upon the rotation of said lens.

3. A device of the character described comprising a receptacle adapted to receive therein a sensitized film; a lens associated with said receptacle, said lens being adapted to direct light rays upon given areas of said film; a plurality of partitions disposed within said receptacle between said lens and said film, said partitions being adapted to confine the light rays to a given area of said film; and means for intermittently rotating said lens about an axis passed through the optical center of said lens at right angles to its axis.

4. A device of the character described comprising a receptacle adapted to receive therein a sensitized film; a pair of wings connected to said receptacle and adapted to be opened or closed with respect to the receptacle, said wings being adapted to carry portions of said film; a lens associated with said receptacle, said lens being adapted to direct light rays upon given areas of said film; and a plurality of partitions disposed within said receptacle between said lens and said film, said partition being adapted to confine light rays to a given area of said film.

5. A device of the character described comprising a receptacle adapted to receive therein a sensitized film; a pair of wings connected to said receptacle and adapted to be opened or closed with respect to the receptacle, said wings being adapted to carry portions of said film; slotted guides associated with said receptacle. said guides being adapted to retain said wings in an open or closed position with respect to the receptacle; a lens associated with said receptacle, said lens being adapted to direct light rays upon given areas of said film; and means for confining the light rays to a given area of said film.

6. A device of the character described comprising a receptacle adapted to receive therein a sensitized film; a pair of wings connected to said receptacle and adapted to be opened or closed with respect to the receptacle, said wings being adapted to carry portions of said film; slotted guides associated with said receptacle, said guides being adapted to retain said wings in an open or closed position with respect to the receptacle; a movable lens associated with said receptacle; and means for intermittently rotating said lens about an axis passed diametrically therethrough, whereby light rays may be projected upon given areas of said film; and a plurality of longitudinally adjustable partitions carried within said receptacle between said lens and film, said partitions being adapted to confine light rays to given areas of said film.

7. A device of the character described comprising a receptacle adapted to receive therein a sensitized film; a lens associated with said receptacle, said lens being adapted to direct light rays upon given areas of said film; means for intermittently rotating said lens about an axis passed through the optical center of the same at right angles thereto; and means for confining the light rays to a given area of said film.

8. A device of the character described comprising a receptacle adapted to receive therein a sensitized film; intermittently actuated lens for directing light rays upon given areas of said film; movable means for confining the light rays to a given area of said film, the movement of the second named means being dependent upon the actuation of said lens; and means for blending the exposure made upon one area with the exposure made upon the adjacent area whereby a single picture may be developed from the several exposures.

9. A device of the character described comprising a receptacle adapted to receive therein a sensitized film; a lens associated with said receptacle; means for rotating said lens about an axis passed through the optical center of the lens at right-angles to its axis to direct light rays upon given areas of said film; means for confining light rays to a given area of said film; and means for blending the exposure made upon one area with the exposure made upon the adjacent area whereby a single picture may be developed from the several exposures.

10. A device of the character described comprising a receptacle adapted to receive therein a sensitized film; a lens associated with said receptacle; means for intermittently rotating said lens about an axis passed through the optical center of the lens at right-angles to its axis to direct light rays upon a given area of said film; and means for blending the exposure made upon one area with the exposure made upon the adjacent area whereby a single picture may be developed from the several exposures.

11. A device of the character described comprising a receptacle adapted to receive therein a sensitized film; a lens associated with said receptacle; means for intermittently rotating said lens about an axis passed through the optical center of the lens at right-angles to its axis to direct light rays upon given areas of said film in succession; means for confining light rays to a given area of said film; and means for blending the exposure made upon one area with the exposure made upon the adjacent area whereby a single picture may be developed from the several exposures.

12. A device of the character described comprising a receptacle adapted to receive therein a sensitized film; a lens associated with said receptacle; means for adjusting the lens with respect to the film; means for rotating said lens about an axis passed through the optical center of the lens at right-angles to its axis to direct light rays upon given areas of said film; means for confining light rays to a given area of said film and means for blending the exposure made upon one area with exposure made upon the adjacent area whereby a continuous picture may be developed from the several exposures.

13. A device of the character described comprising a receptacle adapted to receive therein a sensitized film; intermittently actuated means for exposing given areas of said film; movable means for confining a single exposure to a given area, the movement of the second named means being dependent upon the actuation of the first named means; and means for blending the exposure made upon one area with exposure made upon the adjacent area whereby a single picture may be developed from the several exposures.

14. A device of the character described comprising a receptacle adapted to receive therein a sensitized film; having an area angularly arranged with respect to the adjacent areas, a lens associated with said receptacle, means for moving said lens to bring the axis thereof perpendicular to the angularly arranged portions of the film whereby exposures may be made upon the angularly arranged portions in succession, means for confining the exposures to given areas of the film and means for blending the exposure made upon one area with the exposure made upon the adjacent area whereby a single picture may be developed from the several exposures.

15. A device of the character described comprising a sensitized film, means for moving said film within said receptacle, a lens associated with said receptacle, means for moving said lens whereby exposures may be made upon given areas of said film in succession, means for confining a single exposure to a given area comprising movable partitions adapted to be moved upon the movement of said lens, and means for blending the exposure made upon one area with exposure made upon adjacent area whereby a single picture may be developed from the several exposures.

16. A device of the character described comprising a sensitized film, a lens associated with said receptacle, a spring tending to rotate said lens whereby light rays may be directed upon given areas of said film in succession, operable means for normally preventing the escapement of said spring means for actuating said operable means whereby said lens may be intermittently rotated, and means for confining light rays to a given area of said film.

17. A device of the character described comprising a sensitized film, a lens associated with said receptacle, a spring tending to rotate said lens about an axis passed through the optical center of the lens at right-angles to its axis whereby exposures may be made upon given areas of said film, operable means for normally preventing the escapement of said spring, pneumatic means for actuating the first mentioned means whereby said lens may be intermittently rotated under the influence of said spring, means for confining a single exposure to a given area.

18. A device of the character described comprising a sensitized film, a lens associated with said receptacle, a spring tending to rotate said lens about an axis passed through the optical center of the lens at right-angles to its axis whereby exposures may be made upon given areas of said film, operable means for normally preventing the escapement of said spring, pneumatic means for actuating the first mentioned means whereby said lens may be intermittently rotated under the influence of said spring, means for confining a single exposure to a given area, means for blending the exposure made upon one area with the exposure made upon the adjacent area whereby a single picture may be developed from the several exposures.

19. A device of the character described comprising a sensitized film, a lens associated with said receptacle, means for intermittently rotating said lens about an axis passed through the optical center of the lens at right-angles to its axis to permit exposures to be made upon given areas of said film in succession, means for confining a single exposure to a given area of said film, pneumatic means for limiting the intermittent movement of said lens and the means for blending the exposure made upon one area with the exposure made upon the adjacent area whereby a single picture may be developed from the several exposures.

20. A device of the character described comprising a sensitized film, a lens associated with said receptacle, means for intermittently rotating said lens to expose given areas of said film in succession, means for confining a single exposure to a given area, the last named means comprising a plurality of movable partitions adapted to be actuated simultaneously with said lens, and pneumatic means for limiting the intermittent rotary movement of said lens.

GEORGE H. CHASE.

Copies of this patent may be obtained for five cents each, by addressing the "Commissioner of Patents, Washington, D. C."